United States Patent
Deivasigamani et al.

(10) Patent No.: US 8,630,216 B2
(45) Date of Patent: Jan. 14, 2014

(54) METHOD AND APPARATUS FOR SELECTIVE READING OF SYSTEM INFORMATION IN A MOBILE WIRELESS DEVICE

(75) Inventors: Giri Prassad Deivasigamani, San Jose, CA (US); Venkatasubramanian Ramasamy, San Jose, CA (US); Sharad Garg, San Jose, CA (US); Srinivasan Vasudevan, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 546 days.

(21) Appl. No.: 12/895,398

(22) Filed: Sep. 30, 2010

(65) Prior Publication Data

US 2011/0320856 A1 Dec. 29, 2011

Related U.S. Application Data

(60) Provisional application No. 61/358,334, filed on Jun. 24, 2010.

(51) Int. Cl.
 *G08C 17/00* (2006.01)
(52) U.S. Cl.
 USPC .......................................... 370/311; 370/252
(58) Field of Classification Search
 None
 See application file for complete search history.

(56) References Cited

U.S. PATENT DOCUMENTS

| | | | |
|---|---|---|---|
| 6,317,418 B1 | 11/2001 | Raitola et al. | |
| 8,073,471 B1 * | 12/2011 | Spencer | 455/458 |
| 2005/0130689 A1 * | 6/2005 | Miyamoto | 455/522 |
| 2006/0104204 A1 | 5/2006 | Hansson et al. | |
| 2006/0218457 A1 | 9/2006 | Nakamori et al. | |
| 2006/0229083 A1 * | 10/2006 | Redi | 455/453 |
| 2007/0104220 A1 | 5/2007 | Charlebois | |
| 2007/0183385 A1 * | 8/2007 | Bi et al. | 370/342 |
| 2009/0180413 A1 * | 7/2009 | Sutton | 370/311 |
| 2009/0323648 A1 * | 12/2009 | Park et al. | 370/338 |
| 2010/0085964 A1 * | 4/2010 | Weir et al. | 370/389 |
| 2010/0118747 A9 * | 5/2010 | Anigstein et al. | 370/310 |
| 2013/0022004 A1 * | 1/2013 | Chen et al. | 370/329 |

FOREIGN PATENT DOCUMENTS

WO 2009/082076 7/2009

\* cited by examiner

*Primary Examiner* — Phirin Sam
(74) *Attorney, Agent, or Firm* — Womble Carlyle Sandridge & Rice LLP

(57) ABSTRACT

A method to read selectively system information messages in a mobile wireless communication device. The mobile wireless device receives a first transmission of a multiple segment message through a radio frequency receiver. The mobile wireless device detects decoding errors in at least one of the received segments of the first transmission. In response to detecting decoding errors, the mobile wireless device selectively receives a first subset of segments in a second transmission of the multiple segment message. The mobile wireless device powers down at least a portion of the radio frequency receiver during receive time intervals for a second subset of segments in the second transmission. The first subset of segments in the second transmission corresponds to segments in the first transmission received with decoding errors. The second subset of segments in the second transmission corresponds to segments in the first transmission received without decoding errors.

19 Claims, 6 Drawing Sheets

| SFN # | 0/1 | 2/3 | 4/5 | 6/7 | 8/9 | 10/11 | 12/13 | 14/15 | 16/17 | 18/19 |
|---|---|---|---|---|---|---|---|---|---|---|
| | 302 MIB | X | 304 SIB11 Seg 0 | 304 SIB11 Seg 1 | 302 MIB | 304 SIB11 Seg 2 | 304 SIB11 Seg 3 | 304 SIB11 Seg 4 | 302 MIB | X |

| SFN # | 20/21 | 22/23 | 24/25 | 26/27 | 28/29 | 30/31 | 32/33 | 14/15 | 36/37 | 38/39 |
|---|---|---|---|---|---|---|---|---|---|---|
| | X | X | 302 MIB | X | X | X | 302 MIB | X | 304 SIB 11 Seg 5 | 304 SIB 11 Seg 6 |

| SFN # | 40/41 | 42/43 | 44/45 | 46/47 | 48/49 | 50/51 | ... | 128/129 | 130/131 | 132/133 |
|---|---|---|---|---|---|---|---|---|---|---|
| | 302 MIB | 304 SIB 11 Seg 7 | 304 SIB 11 Seg 8 | X | MIB | X | | 302 MIB | X | 302 SIB 11 Seg 0 |

← SIB 11 Repeats

METHOD AND APPARATUS FOR SELECTIVE READING OF SYSTEM INFORMATION IN A MOBILE WIRELESS DEVICE

CROSS-REFERENCE TO RELATED APPLICATIONS

This patent application takes priority under 35 U.S.C. 119 (e) to U.S. Provisional Patent Application Ser. No. 61/358, 334 entitled, "METHOD AND APPARATUS FOR SELECTIVE READING OF SYSTEM INFORMATION IN A MOBILE WIRELESS DEVICE" by Vasudevan et al. filed Jun. 24, 2010 which is incorporated by reference herein in its entirety for all purposes.

TECHNICAL FIELD

The described embodiments relate generally to wireless mobile communications. More particularly, a method is described for selectively reading system information blocks by a mobile wireless communication device.

BACKGROUND OF THE INVENTION

Mobile wireless communication devices, such as a cellular telephone or a wireless personal digital assistant, can provide a wide variety of communication services including, for example, voice communication, text messaging, internet browsing, and electronic mail. Mobile wireless communication devices can operate in a wireless communication network of overlapping "cells", each cell providing a geographic area of wireless signal coverage that extends from a radio network subsystem. The radio network subsystem provides an "air interface" through which the mobile wireless communication device can access the wireless communication network. Whether idle or actively connected, a mobile wireless communication device can be associated with a "serving" cell in a wireless communication network and be aware of neighbor cells to which the mobile wireless communication device can also associate. The quality of a communication link between the mobile wireless communication device and the radio network subsystem can vary based on the distance between them and on interference included in received signals at either end of the air interface. As the mobile wireless communication device moves further away from the radio network subsystem, eventually a neighbor cell can provide an equal or better performing communication link than the current serving cell. The mobile wireless communication device can include a process for determining if and when to switch cells with which it associates. If the mobile wireless communication device is actively connected to the serving cell, then the process of switching to a neighbor cell is known as "handoff." For a mobile wireless communication device that is associated with a serving cell in an "idle" state, the process of associating with a neighbor cell is known as "cell reselection."

When a mobile wireless communication device seeks to associate with a wireless communication network, such as after a power on initialization, the mobile wireless communication device can search for cells located in its vicinity. Initially locating and connecting to a serving cell by a mobile wireless communication device can be referred to as "cell selection". If a cell is located that is deemed suitable to provide a wireless communication link, e.g. signals from the cell exceeds certain performance quality metrics, then the mobile wireless communication device can associate with that cell. The mobile wireless communication device can be referred to as being "camped" on a particular "serving" cell in the wireless communication network of cells. While camped on the serving cell, the mobile wireless communication device can listen to messages broadcast from the serving cell's radio network subsystem as well as from other radio network subsystems located in neighbor cells. System information that specifies certain properties of the serving cell and its neighbor cells can be broadcast regularly by the serving cell's radio network subsystem. If the mobile wireless communication device determines that a neighbor cell can provide a higher quality communication link than a current serving cell, then the mobile wireless communication device can disassociate from the current serving cell and associate with the neighbor cell, in a process known as "cell reselection".

The length of time that a battery can power the mobile wireless communication device can differentiate the mobile wireless communication device from other products in today's competitive marketplace. Reducing power consumption in the mobile wireless communication device, e.g. by disabling certain components when they are not required, can extend battery life significantly. When the mobile wireless communication device is connected to the serving cell in an "idle" mode, the mobile wireless communication device can "wake" to read certain system information messages broadcast by the serving cell's radio network subsystem and "sleep" in between readings to conserve power. Some of the system information messages broadcast by the radio network subsystem can be broken into a series of individual segments, with each segment being transmitted separately. The mobile wireless communication device can "wake" to read a segment and "sleep" between segments.

As the connection between the mobile wireless communication device and the serving cell's radio network subsystem can vary in signal strength and interference levels over time, some of the transmitted segments of the system information message can be received correctly while other segments can include transmission errors. The mobile wireless communication can be unable to decode a reassembled system information message that includes segments received with errors. The system information message can be re-broadcast by the radio network subsystem at regular intervals, so the mobile wireless communication device can read the system information message again. Rereading all of the segments of the broadcast system information message to reassemble it correctly, however, can increase "wake" time and thereby reduce battery power. The mobile wireless communication device can unnecessarily "wake" to read segments of the system information message previously received correctly. Selective reading of only certain segments of the system information message can increase "sleep" time and thereby conserve reduce power consumption and preserve battery power instead.

SUMMARY OF DESCRIBED EMBODIMENTS

This paper describes various embodiments that relate to methods and apparatus to read selectively system information messages to reduce power consumption in a mobile wireless communication device.

In an embodiment, a method includes the following steps performed by a mobile wireless communication device. The mobile wireless communication device receives a first transmission of a multiple segment message through a radio frequency receiver from a wireless communication network. The mobile wireless communication device detects at least one decoding error in at least one of the received segments of the first transmission. The mobile wireless communication device powers down at least a portion of the radio frequency receiver during receive time intervals for a first subset of segments in the second transmission of the multiple segment message. The mobile wireless communication device receives selectively a second subset of segments in a second transmission of the multiple segment message. The first subset of segments in the second transmission corresponds to segments in the first transmission received without decoding errors. The second subset of segments in the second transmission corresponds to segments in the first transmission received with decoding errors.

In another embodiment, a method includes the following steps performed by a mobile wireless communication device connected to a wireless communication network. The mobile wireless communication device receives multiple repeated copies of a system information message transmitted by a radio network subsystem in the wireless communication network. The mobile wireless communication device assembles and decodes the system information message from multiple segments correctly received in the multiple repeated copies. At least a portion of a receiver in the mobile wireless communication device powers down during time intervals of later copies corresponding to segments received correctly in earlier copies of the system information message.

In a further embodiment, a mobile wireless communication device includes a control processor and a transceiver coupled to the control processor. The transceiver includes a receiver configured to receive wireless transmissions from a radio network subsystem in a wireless communication network. The mobile wireless communication device is configured to receive a system information message by a sequence of operations. The mobile wireless communication device is configured to determine a first copy of the system information message contains changed values. The mobile wireless communication device is configured to receive all segments of the first copy of the system information message and to detect an error in at least one received segment of the first copy of the system information message. The mobile wireless communication device is configured to discard segments of the first copy received with an error and to retain segments of the first copy received without error. The mobile wireless communication device is configured to receive correctly segments of subsequent copies of the system information message corresponding to the segments of the first copy received with an error. The mobile wireless communication device is configured to assemble the system information message from the retained segments of the first copy and the correctly received segments of subsequent copies.

In an additional embodiment, a computer readable medium for storing non-transitory computer program code executable by a processor in a mobile wireless communication device for selectively receiving multiple segments of a message includes at least the following non-transitory computer program codes. A non-transitory computer program code for receiving a first transmission of the message from a wireless communication network through a radio frequency receiver. A non-transitory computer program code for detecting at least one decoding error in at least one segment received in the first transmission. A non-transitory computer program code for powering down at least a portion of the radio frequency receiver during receive time intervals for a first subset of segments in a second transmission of the message from the wireless communication network. A non-transitory computer program code for selectively receiving a second subset of segments in the second transmission of the multiple segment message. The first subset of segments in the second transmission corresponds to segments in the first transmission received without decoding errors, and the second subset of segments in the second transmission corresponds to segments in the first transmission received with decoding errors

BRIEF DESCRIPTION OF THE DRAWINGS

The invention and the advantages thereof may best be understood by reference to the following description taken in conjunction with the accompanying drawings.

FIG. 3 illustrates a sequence of transmitted segments for a broadcast system information block.

DETAILED DESCRIPTION OF EXAMPLE EMBODIMENTS

In the following description, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

Figure 1:
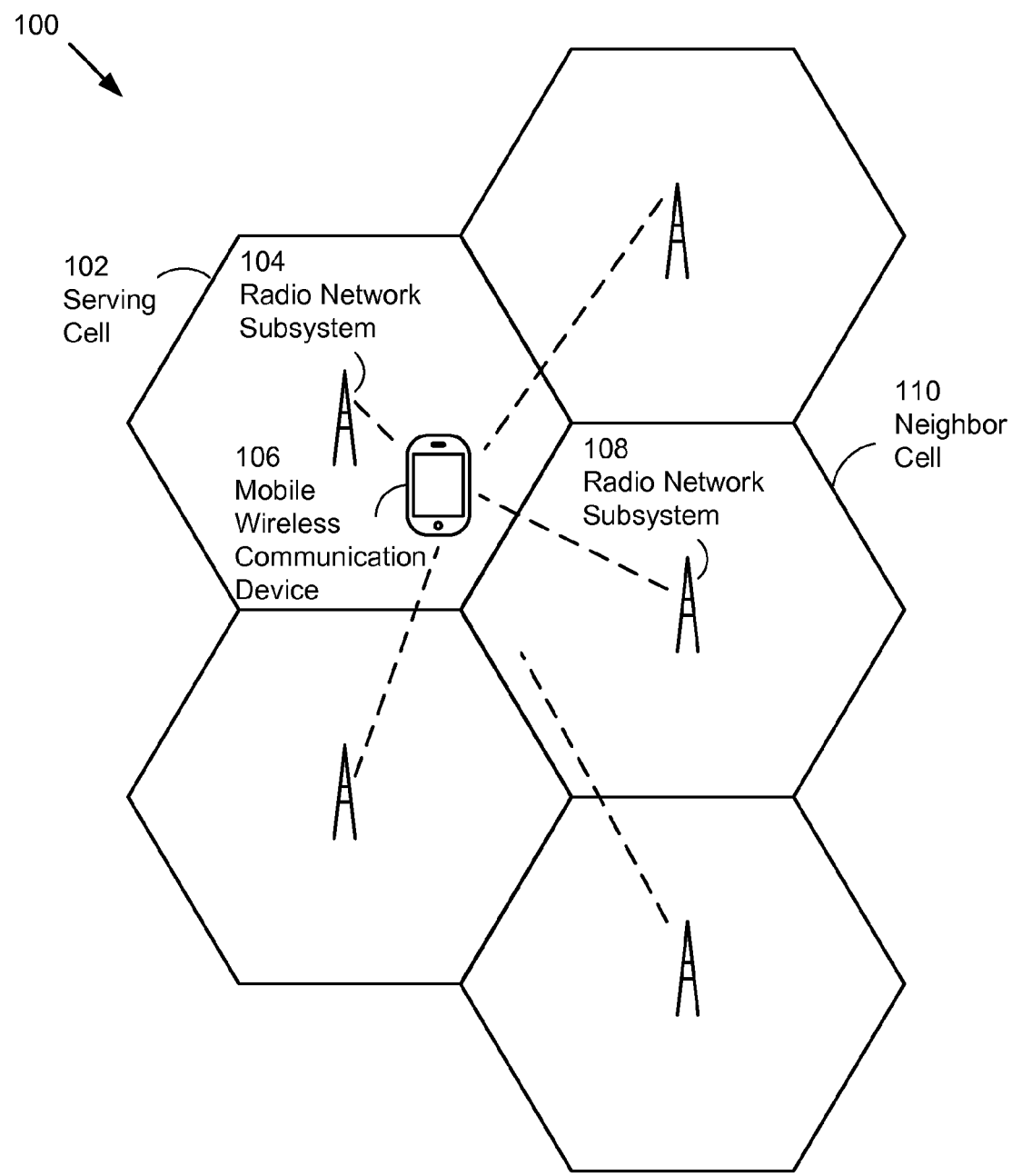
FIG. 1 illustrates a mobile wireless communication device located within a wireless cellular communication network.

A mobile wireless communication device 106 can include the capability to connect seamlessly with a wireless communication network 100 of overlapping wireless communication cells, each wireless communication cell covering a geographic area extending from a radio network subsystem 104 as illustrated in FIG. 1. The mobile wireless communication device 106 can receive communication signals from radio network subsystems located in different cells in the wireless communication network 100, and each cell can be located at a different distance from the mobile wireless communication device 106. As signal strength of a wireless communication signal decays proportionally to the square of the distance between a transmitting end and a receiving end, the mobile wireless communication device 106 can monitor the received signal strength from several different cells in the wireless communication network 100 to determine a cell having the strongest received signal at any given time. As the mobile wireless communication device 106 changes locations within a wireless communication network 100, the received signal strength can vary substantially, and thus the cell from which the mobile wireless communication device 106 receives the strongest signal can change.

After a "power on" initialization, or similarly when entering a "new" wireless communication network, the mobile wireless communication device 106 can seek to associate with a cell in the wireless communication network 100, i.e. to "select" a cell. A radio network subsystem in each cell of the wireless communication network 100 can broadcast a series of system information messages at regular intervals that identify salient characteristics of the radio network subsystem as well as certain properties of radio network subsystems located in neighbor cells. Based on measurements of received signal strength, or other quality metrics such as carrier to interference ratios, the mobile wireless communication device 106 can associate with a radio network subsystem 104, thereby "selecting" a particular cell within the wireless communication network 100 as a "serving" cell 102. The process of associating with a "serving" cell can be also known as "camping" on that cell.

After associating with the serving cell 102, the mobile wireless communication device 106 can initiate connections (such as voice or data calls) with the wireless communication network 100 through the radio network subsystem 104 of the serving cell 102. The radio network subsystem 104 in the serving cell 102 can also initiate connections to the mobile wireless communication device 106, as the wireless network 100 can be aware of the association between the serving cell 102 and the mobile wireless communication device 106. While "camped" on the serving cell 102, the mobile wireless communication device 106 can monitor broadcast signals from the radio network subsystem 104 that include system information to determine if and when to associate with a different radio network subsystem 108 in a neighbor cell 110.

System information can be communicated from the radio network subsystem 104 in the serving cell 102 to the mobile wireless communication device 106 camped on the serving cell through system information messages (also called system information blocks). Parameters associated with a common function can be grouped together in a system information message of a particular type. As a representative example, the third-generation (3G) mobile communication technology known as Universal Mobile Telecommunications System (UMTS), which is developed and maintained by the $3^{rd}$ Generation Partnership Project (3GPP), includes a radio resource control (RRC) protocol that organizes system information into one of a number of different system information blocks (SIBs). In order to enable mobile wireless communication devices 106 in the serving cell 102 to determine which SIBs are broadcast by the radio network subsystem 104 and in which specific system frames the SIBs will occur, a master information message, also called a master information block (MIB), can be broadcast regularly that can provide scheduling information about the SIBs. The MIB can be transmitted on a broadcast control (BCCH) logical channel, which can be mapped to a broadcast (BCH) transport channel. (The mobile wireless communication device 106 can also receive SIBs and MIBs transmitted by the radio network subsystem 108 in the neighbor cell 110.)

In a representative embodiment, the MIB can be broadcast once every 8 system frames of 10 ms each (i.e. once per 80 ms). The scheduling of the MIB can be thus static and regular, while the scheduling of SIB blocks of different types can be dynamic and irregular. The MIB can be broadcast frequently by the radio network subsystem 104 in the serving cell 102 to ensure there is low latency when the mobile wireless communication device 106 reads a current MIB; however, the system information for a cell can change at a slower rate than the MIB broadcast rate, so reading every MIB that is broadcast every 80 ms can be inefficient. Instead, the mobile wireless communication device 106 can receive an indication when system information changes through a paging indication on a paging (PCH) transport channel broadcast by the radio network subsystem 104. In an idle mode, the mobile wireless communication device 106 can cycle between "sleep" periods and "wake" periods in a cycle known as discontinuous reception (DRX). During a "wake" period, the mobile wireless communication device 106 can monitor a paging indicator channel (PICH). If system information has changed, as indicated by a message received on the PICH, then the mobile wireless communication device 106 can awaken to read the next broadcast MIB for additional system information.

Figure 2:
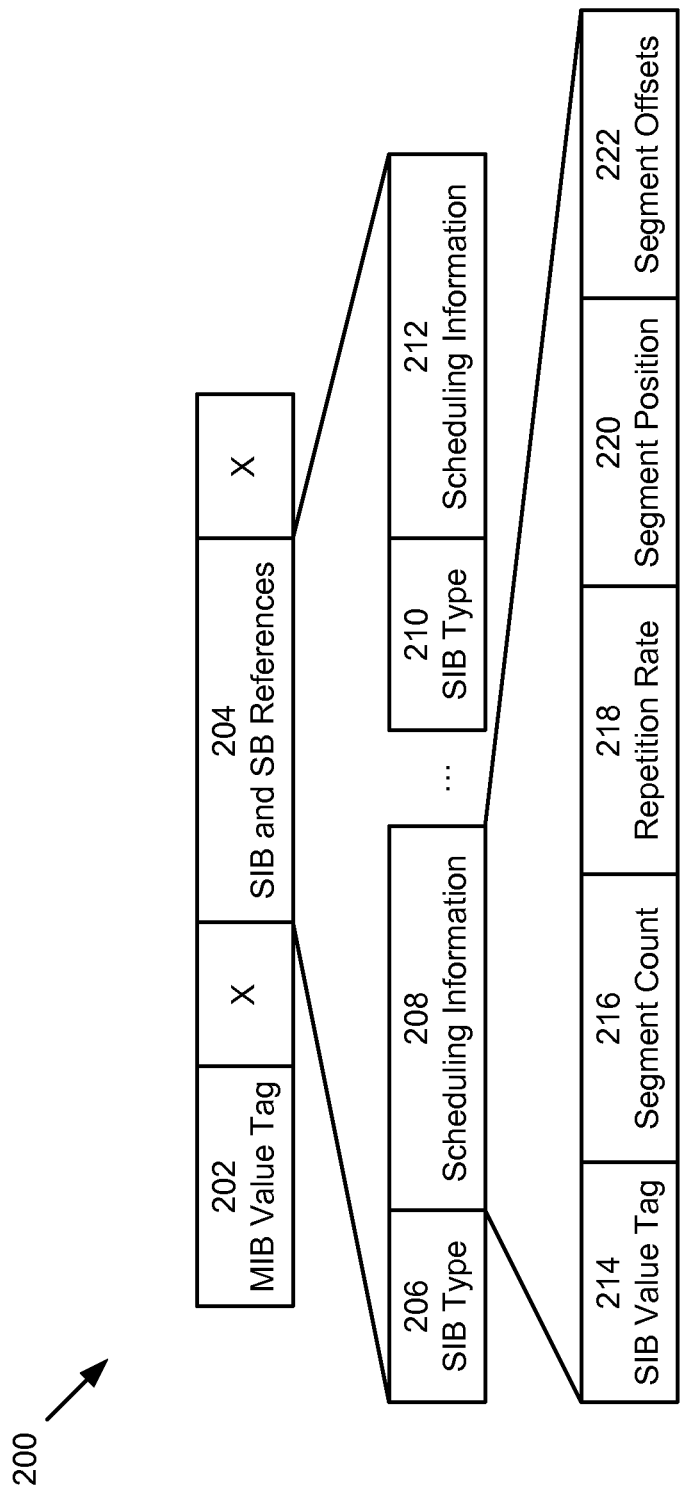
FIG. 2 illustrates a structure for a broadcast master information block.

FIG. 2 illustrates a representative format for a MIB 200. The MIB 200 can include a MIB value tag 202 that can indicate if system information values of one or more SIBs referred to in the MIB 200 have changed. (SIB reference information can be included in the MIB 200, but the actual SIB can be transmitted separately from the MIB 200.) In a representative embodiment, the MIB value tag 202 can be an integer value that increments each time that the contents of the MIB 200 changes. The MIB 200 can also include one or more SIB references 204 (and optional scheduling block (SB) references) that can specify scheduling information about a SIB. The scheduling information can indicate how and when the SIB can be transmitted by the radio network subsystem 104, and therefore indicate when the mobile wireless communication device 106 can be "awake" to read the information. Additional blocks can be included in the MIB 200 format as indicated by the boxes marked with an "x". Multiple SIB references can be included in the MIB 200. Each SIB reference 204 can include information about a SIB of a particular type. Different SIB types can pertain to different modes of the mobile wireless communication device 106, for example, SIB type 3 can be used in an idle state, while SIB type 4 can be used in a connected state. The radio network subsystem 104 of the serving cell 100 in the wireless communication network 100 can broadcast only those SIB types used by the serving cell 100, thereby specifying capabilities of the wireless communication network 100. Some SIBs can change values more frequently than others, so the MIB can include scheduling information using timers measured by counts of system frames that indicate when the SIB should be read. Other SIBs can change less frequently and the scheduling information can indicate during which system frames the SIB can occur.

The SIB reference 204 block can include a SIB type 206 followed by a detailed SIB scheduling information 208 block for that SIB type 206. The SIB scheduling information 208 block associated with a SIB type 206 can include a SIB value tag 214 that can indicate if the SIB value has changed. With the combination of the page indication, the MIB value tag 202 and the SIB value tag 206, the mobile wireless communication device 106 can limit reading a SIB of a particular type to those times when the SIB value has changed, rather than repeatedly reading the same SIB value, thereby reducing wake time of the mobile wireless communication device 106 and conserving battery power. The scheduling information 208 block can also include a segment count 216 that can indicate the number of distinct segments into which the SIB is divided. Some SIB types 206 can carry an amount of information that can vary and can require multiple segments in order to transmit the SIB completely. For example, a SIB type 11 can include information about neighbor cells for a current serving cell, so the amount of information in a SIB 11 can vary based on the number of neighbor cells. A repetition rate 218 can follow the segment count 216 and can indicate how often the SIB repeats, for example as measured by the number of system frames per repetition cycle. All segments of a SIB of a particular SIB type 206 can have the same repetition rate 218. A segment position 220 can indicate the position of the first segment of the SIB within a single repetition cycle. Subsequent segments of the SIB can be specified by a block of SIB offsets 222 listed in ascending order, each SIB offset 222 value representing a number of system frames. A SIB segment position can be calculated by adding a SIB offset 222 to the previous segment's position. System frame numbers can be broadcast by the radio network subsystem 104 of the serving cell 102 and can provide a common time reference for all mobile wireless communication devices 106 in the serving cell 102. Multiple SIB repetition cycles can fit within a complete cycle of system frame numbers, as the system frame numbers can repeat once per 4096 system frames of 10 ms each (40.96 seconds total), while the SIB repetition cycle can be once per the number of frames specified in the repetition rate 218 block.

FIG. 3 illustrates a representative repetition cycle 300 of 128 system frames for a system information block of type 11 (SIB 11). System frame numbers can be grouped into pairs of 10 ms system frames, and each pair can correspond to a 20 ms BCCH frame. A MIB 302 can repeat every 8 system frames (every 4 BCCH frames). The SIB 11 can be transmitted as a sequence of SIB 11 segments 304. A first SIB 11 segment (Seg 0) can occur in system frames 4 and 5. A second SIB 11 segment (Seg 1) can occur in system frames 6/7 at an offset of 2 system frames from the first SIB 11 segment (Seg 0). Additional SIB 11 segments can occur in system frames not occupied by MIBs, and consecutive SIB 11 segments can be separated by additional system frames, as shown by the gap between the fifth SIB 11 segment (Seg 4) in system frames 14/15 and the sixth SIB 11 segment (Seg 5) in system frames 36/37. As shown in FIG. 3, the first SIB 11 segment 304 (Seg 0) can occur in system frames 4/5 and can repeat in system frames 132/133, thus a SIB segment 304 position value can be related to the system frame number modulo the repetition rate.

Decoding of the system information broadcast by the radio network subsystem 104 in the serving cell 102 or by a radio network subsystem 108 in a neighbor cell 110 can be managed by a radio resource control (RRC) layer 3 function in the mobile wireless communication device 106. The RRC layer in the mobile wireless communication device 106 can learn that system information has changed by listening during a wake period to the paging indicator channel. The RRC layer can decode a subsequent MIB to determine in which system frames pertinent system information can be scheduled. The RRC layer can "awaken" the mobile wireless communication device's 106 radio receiver to receive relevant SIB segments and to "sleep" between SIB segments. Each SIB segment can be decoded individually and then reassembled as a complete SIB that can provide a specific set of system information. Each SIB segment can be corrupted separately by noise or interference during transmission, so a complete and correct SIB can only be assembled when all SIB segments are received correctly. Some current implementations can discard all segments of a SIB when one or more of the SIB segments are received incorrectly. All of the SIB segments for a SIB can then be received again to assemble a complete SIB without errors. Re-reading all SIB segments, however, can be power inefficient, as the mobile wireless communication device's radio receiver can wake to read SIB segments correctly received previously. This redundant SIB segment reception can drain battery current unnecessarily. Thus, in a representative implementation, the mobile wireless communication device 106 can instead awaken to receive only those SIB segments required to complete a SIB message.

Figure 4:
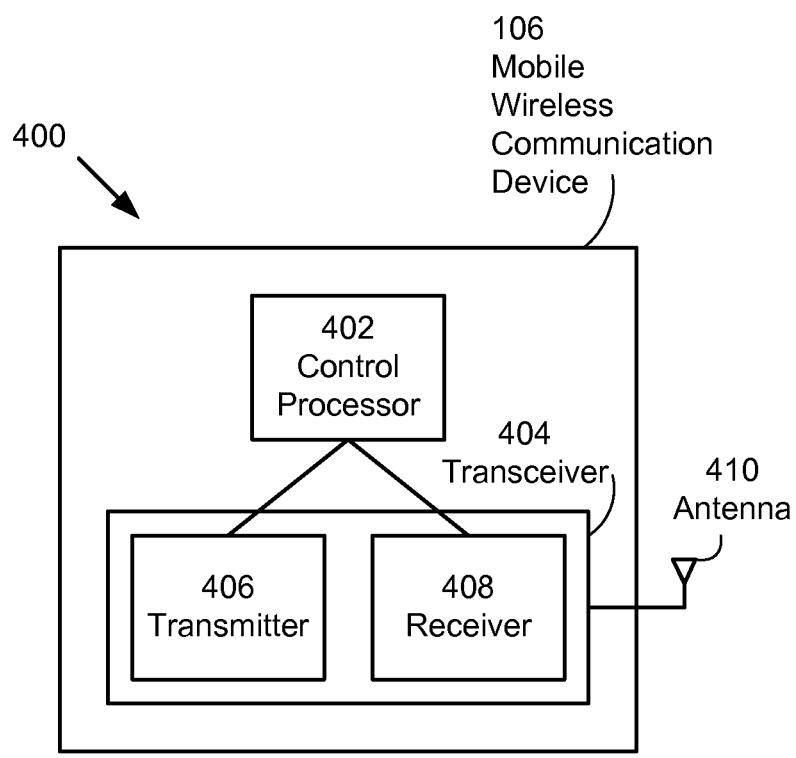
FIG. 4 illustrates representative processing units in the mobile wireless communication device.

FIG. 4 illustrates representative processing elements within the mobile wireless communication device 106. Wireless transmissions between the mobile wireless communication device 106 and the radio network subsystems 104/108 within the wireless communication network 100 can be transmitted and received through a transceiver 404. The transceiver 404 can include a transmitter 406 and a receiver 408 coupled to an antenna 410. A control processor can be coupled to the transceiver 404 and can process the RRC layer 3 functions in the mobile wireless communication device, while the transceiver 404 can process all or part of a set of lower layer 1 and 2 functions. The lower layer 1 function can include physical layer functions, while the lower layer 2 function can include link layer functions. All or portions of the receiver 408 can be placed in a power conserving "sleep" mode under the direction of the control processor 402. The control processor 402 can "awaken" the receiver 408 to receive selectively SIB messages in whole or in part. By reducing the frequency and length of "wake" times for the receiver 408, the control processor 402 can reduce power consumption and preserve battery power for the mobile wireless communication device 106.

Figure 5:
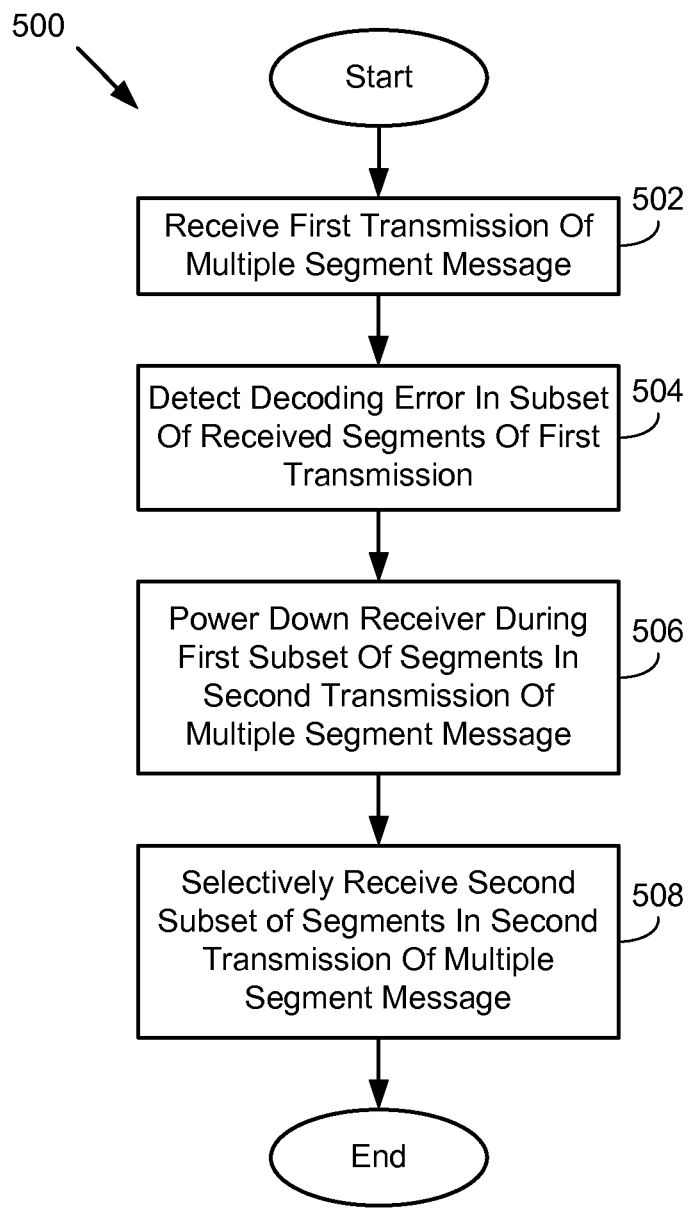
FIG. 5 illustrates a representative method for selectively reading segments of a system information block.

FIG. 5 illustrates a representative method 500 to reduce power consumption by selectively receiving segments of received transmissions by the receiver 408 of the mobile wireless communication device 106. In step 502, a first transmission of a multiple segment message can be received by the receiver 408 of the mobile wireless communication device 106. The multiple segment message can include segments transmitted during two or more time intervals separated in time. Intervening time intervals can include transmissions that can be not part of the multiple segment message. The receiver 408 of the mobile wireless communication device 106 can decode each segment of the multiple segment message. The multiple segment message can be completely reconstructed using a set of correctly decoded segments received by the receiver 408. Reassembling the correctly decoded multiple segments can be accomplished by the receiver 408 or by the control processor 402 connected to the receiver 408.

Some of the received segments in the multiple segment message can be received incorrectly, and errors can occur upon decoding by the receiver 408. The errors can occur due to weak received signal power or to increased levels of noise and interference or to other common signal corruptions that can occur in wireless communication systems. In step 504, the receiver can detect decoding errors in a subset of the received segments of the first transmission of the multiple segment message. As the multiple segment message can be repetitively transmitted by the radio network subsystem 104 in the serving cell 102 of the wireless communication network 100, the mobile wireless communication device 106 can discard segments of the first transmission received in error and receive again segments transmitted subsequently. Correctly received segments of the first transmission can be retained by the receiver 408 or by the control processor 402 or both.

Rather than receive all segments of a second transmission of the multiple segment message, the mobile wireless communication device 106 can selectively receive only those segments that correspond to segments incorrectly received with decoding errors and therefore needed to reassemble a complete and correct copy of the transmitted multiple segment message. In step 506, the receiver 408 of the mobile wireless communication device 106 can be powered down during a first subset of segments in a second transmission of the multiple segment message, the first subset corresponding to those segments received correctly and without decoding errors in the first transmission. As some segments in the first transmission can have been received correctly initially, the receiver 408 can be configured to not receive them again in a subsequent transmission. In step 508, during a second transmission of the multiple segment message, the receiver 408 can receive selectively a second subset of segments of the multiple segment message. Those portions of the receiver 408 required to receive and decode a segment of the multiple segment message can be powered up to effect the reception and decoding. The second subset of segments can correspond to segments received incorrectly or with decoding errors from the first transmission.

Some of the segments of the second transmission can be received incorrectly, and steps 506 and 508 can be repeated with the receiver powered down during segments that were correctly received during any previous transmissions of the multiple segment message and powered up to receive segments that were incorrectly received during the most recent transmission. The receiver can continue to selectively receive any segments incorrectly received segments during all previous transmissions until all segments of the multiple segment message have been received correctly. The radio network subsystem 104 in the serving cell 102 of the wireless communication network 100 can repeatedly transmit the multiple segment message, and each copy of the multiple segment message can be transmitted over separate system frames with an identical pattern. For example, the pattern as shown in FIG. 3 illustrates a system information block type 11 multiple segment message that repeats every 132 pairs of system frames. With knowledge of the multiple segment message's pattern, the control processor 402 in the mobile wireless communication device 106 can power up the receiver 408 during time intervals corresponding to only those segments yet to be received correctly and power down during time intervals in between those segments.

Figure 6:
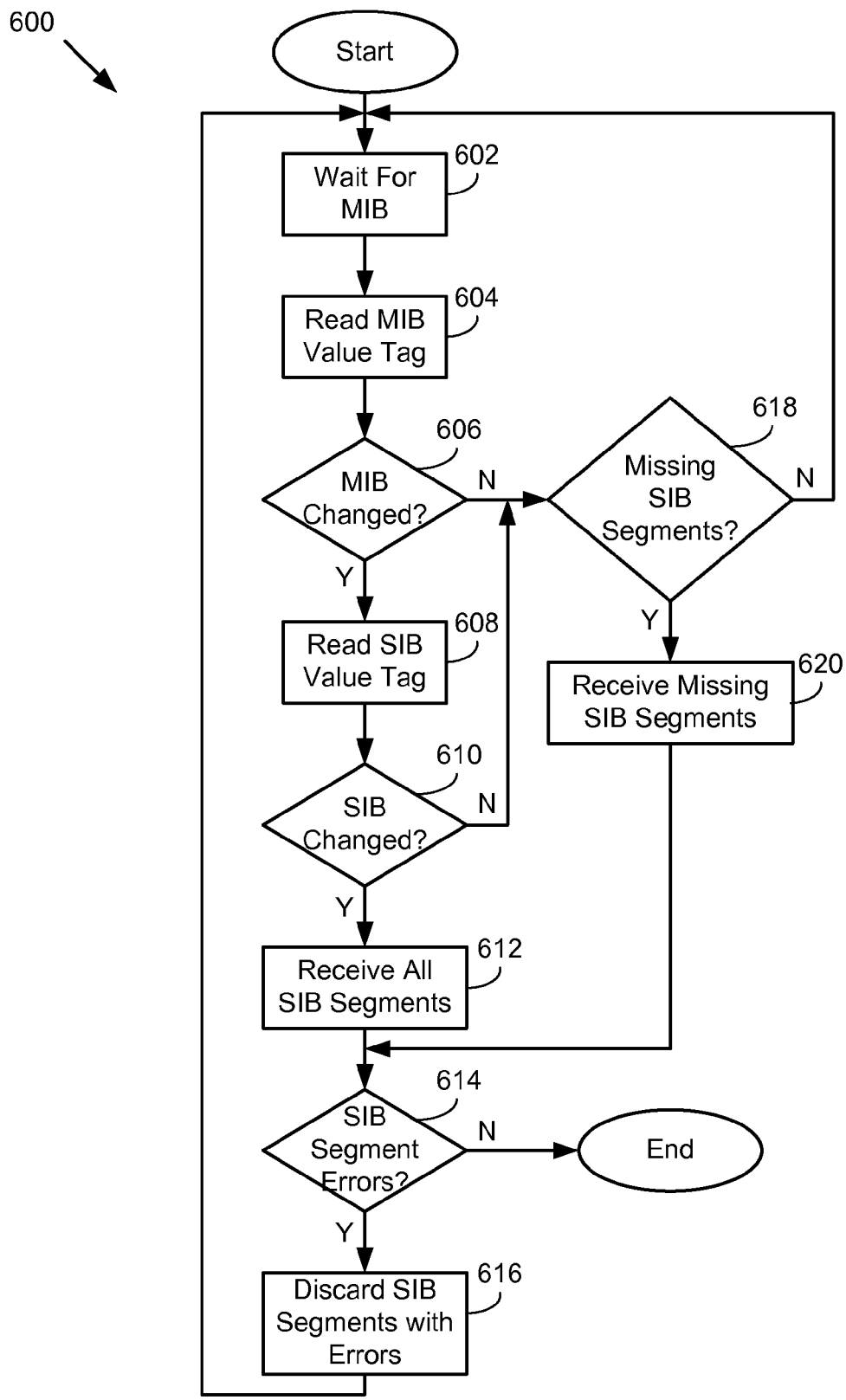
FIG. 6 illustrates another representative method for selectively reading segments of a system information block.

FIG. 6 illustrates another representative method 600 to reduce the "wake" time of a mobile wireless communication device 106 by selectively reading SIB segments. In step 602, the mobile wireless communication device 106 can wait for a MIB, which can be received and a value tag of the MIB read in step 604. The mobile wireless communication device 106 need not read every MIB sent by the radio network subsystem 104 of the serving cell 102. Rather, the mobile wireless communication device 106 can wait for and read a MIB following an indication on a paging indicator channel. Paging indications can be much less frequently transmitted by the radio network subsystem 104 than MIBs. If the MIB has changed, based on the MIB value tag read in step 604, then the mobile wireless communication device 106 can read additional information in SIB blocks contained in the MIB. Multiple SIB blocks can be transmitted by the radio network subsystem 104, each on a different schedule. The mobile wireless communication device 106 can read a SIB value tag in step 608 and determine if the SIB has changed values in step 610. If the SIB value has changed, then all SIB segments for the SIB can be read in step 612. A change in SIB value can result in previously received SIB segments being superseded. In step 614, the mobile wireless communication device 106 can determine if any of the SIB segments were received with errors. Each SIB segment can include a cyclic redundancy check (CRC) block that the mobile wireless communication device 106 can use to determine whether errors occurred. If all SIB segments were received correctly, then the RRC layer can correctly assemble a complete SIB and reception of the SIB can end. If some of the SIB segments were received incorrectly, then the mobile wireless communication device 106 can discard any SIB segments with detected errors in step 616 and repeat the process. The process can also start over when a subsequent page indicates that system information has changed, and the SIB can be read again.

When the MIB value tag read in step 604 indicates that the MIB value (and therefore the system information) has not changed, then the mobile wireless communication device 106 can determine in step 618 if a SIB has been partially received correctly. Certain segments of a SIB can be missing because the mobile wireless communication device discarded SIB segments with error in step 616 or because a SIB segment was lost in transmission altogether. Rather than discard all SIB segments are read the entire SIB block again, the mobile wireless communication device 106 can read only missing SIB segments in step 620. The mobile wireless communication device 106 can wake to read only the missing SIB segments and sleep between missing SIB segments, thereby increasing sleep time, reducing wake time and conserving battery power. A schedule of when to wake can be determined by the mobile wireless communication device 106 using the segment position 220 and segment offsets 222 contained in the scheduling information 208 for a SIB having a particular SIB type 206. If any of the missing SIB segments read in step 620 are received in error as determined in step 614, then the mobile wireless communication device 106 can discard the SIB segments with errors in step 616 and repeat the process. If the MIB has not changed in step 606, and there are no missing SIB segments in step 618, then a previously correctly read SIB can be still valid, and the process can repeat waiting for a subsequent MIB with a changed MIB value.

In addition to the representative embodiments described herein for the 3GPP UMTS communication protocol, other wireless communication protocols, such as Global System for Mobile Communications (GSM) protocols and Long Term Evolution (LTE) protocols can include communication of system information transmitted from radio network subsystems 104/108 in the serving cell 102 and neighbor cell 110 to the mobile wireless communication device 106. Each communication protocol can use a different specific format for system information messages than described herein for UMTS. The system information can be transmitted, by the radio network subsystems 104/108 located in serving cells 102 and/or in neighbor cells 110 of the wireless communication network 100, at regular intervals or at specific times indicated on a paging channel.

One or more of the system information messages can be divided into multiple segments separated across different system frames and/or during different transmit time intervals. Successive segments of a particular system information message can be separated in time from adjacent segments and interspersed with other transmissions, such as with segments from a different system information message. The system information message can be transmitted repeatedly by the radio network subsystems 104/108 and can allow the mobile wireless communication device 106 multiple opportunities to receive and correctly decode the transmitted system information message. The mobile wireless communication device 106 can receive correctly a portion of all of the segments of a system information message during a first transmission and can receive incorrectly another portion of the segments of the system information message. The radio network subsystems 104/108 can indicate a schedule for when the segments of the system information message can be transmitted. Using the schedule, the mobile wireless communication device 106 can receive selectively in a subsequent transmission only those segments of the system information message previously received incorrectly. The receiver 408 of the mobile wireless communication device 106 can be powered up during the selective reception, and all or part of the receiver 408 can be powered down in between the selectively received segments to reduce power consumption and preserve battery power. A complete system information message can be received and correctly decoded by assembling correctly received segments from multiple transmissions rather than from segments received in sequence from a single transmission.

Various aspects of the described embodiments can be implemented by software, hardware or a combination of hardware and software. The described embodiments can also be embodied as computer program code on a computer readable medium for controlling a mobile wireless communication device. The computer readable medium is any data storage device that can store data that can thereafter be read by a computer system. Examples of the computer readable medium include read-only memory, random-access memory, CD-ROMs, DVDs, magnetic tape and optical data storage devices. The computer readable medium can also be distributed over network-coupled computer systems so that the computer program code is stored and executed in a distributed fashion.

The various aspects, embodiments, implementations or features of the described embodiments can be used separately or in any combination. The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
   in a mobile wireless communication device connected to a wireless communication network:
      receiving a first transmission of a multiple segment message from the wireless communication network through a radio frequency receiver;
      detecting at least one decoding error in at least one received segment of the first transmission;
      powering down at least a portion of the radio frequency receiver during receive time intervals for a first subset of segments in a second transmission of the multiple segment message from the wireless communication network;
      selectively receiving a second subset of segments in the second transmission of the multiple segment message; and
      powering up at least the portion of the radio frequency receiver previously powered down prior to selectively receiving the second subset of segments in the second transmission of the multiple segment message;
      wherein the first subset of segments in the second transmission corresponds to one or more segments in the first transmission received without decoding errors, and the second subset of segments in the second transmission corresponds to the at least one received segment in the first transmission received with decoding errors.

2. The method as recited in claim 1, further comprising:
   repeating the detecting, powering down, powering up and selectively receiving steps until each segment of the multiple segment message has been received correctly.

3. The method as recited in claim 2, wherein each segment includes one or more system frames, and the second subset of segments in the first transmission of the multiple segment message includes at least two segments separated by one or more system frames that are not part of the multiple segment message.

4. The method as recited in claim 3, wherein the multiple segment message comprises a system information block message.

5. The method as recited in claim 4, further comprising:
   receiving a master information block message broadcast by the wireless communication network that specifies when the system information block message can be received.

6. The method as recited in claim 5, wherein the master information block includes a tag indicating when values contained in the system information block change.

7. A method, comprising:
   in a mobile wireless communication device connected to a wireless communication network:
      receiving multiple repeated copies of a system information message transmitted by a radio network subsystem in the wireless communication network;
      assembling and decoding the system information message from multiple segments correctly received in the multiple repeated copies; and
      controlling a receiver, by a control processor in the mobile wireless communication device, to power up and receive segments of the system information message received incorrectly previously;
      wherein at least a portion of the receiver in the mobile wireless communication device powers down during time intervals in which one or more later copies, corresponding to segments received correctly in one or more earlier copies, of the system information message are transmitted.

8. The method as recited in claim 7, further comprising: detecting by the receiver at least one error in at least one segment of at least one received copy of the system information message.

9. The method as recited in claim 7, further comprising: receiving a master information message broadcast by the radio network subsystem in the wireless communication network; wherein the master information message contains information about when the segments of each copy of the system information message are transmitted.

10. The method as recited in claim 9, wherein the master information message contains an indication when values in the system information message change.

11. A mobile wireless communication device, comprising:
   a control processor, and
   a transceiver coupled to the control processor, the transceiver including a receiver configured to receive wireless transmissions from a radio network subsystem in a wireless communication network;
   wherein the mobile wireless communication device is configured to receive a system information message, the mobile wireless communication device comprising:
      logic configured to determine a first copy of the system information message contains changed values, wherein each copy of the system information message contains segments spaced apart in an identical pattern;
      logic configured to receive all segments of the first copy of the system information message;
      logic configured to detect an error in at least one received segment of the first copy of the system information message;
      logic configured to discard first segments of the first copy received with an error;

logic configured to retain second segments of the first copy received without error;

logic configured to receive one or more segments of subsequent copies of the system information message that correspond to the first segments of the first copy received with an error; and logic configured to assemble the system information message from the retained second segments of the first copy and the one or more received segments of subsequent copies.

12. The mobile wireless communication device as recited in claim 11, wherein before each segment of the system information has been correctly received, the control processor is configured to power down at least a part of the receiver during time intervals in subsequent copies of the system information message that correspond to segments of the system information message received correctly in a prior copy.

13. The mobile wireless communication device as recited in claim 11, wherein the receiver is configured to receive a master information message; and the control processor is configured to determine the pattern of the segments in the system information message based on information contained in the master information message.

14. The mobile wireless communication device as recited in claim 13, wherein the control processor is configured to determine the first copy of the system information message contains changed values based on information contained in the master information message.

15. A non-transitory computer readable medium having at least one program to control a mobile wireless communication device connected to a radio access system in a wireless communication network stored thereon, the at least one program configured to, when executed, cause the mobile wireless communication device to:

receive a first transmission of a message comprising multiple segments from the wireless communication network through a radio frequency receiver;

detect at least one decoding error in at least one segment received in the first transmission;

power down at least a portion of the radio frequency receiver during receive time intervals for a first subset of segments in a second transmission of the message from the wireless communication network, the first subset of segments in the second transmission corresponding to segments in the first transmission received without decoding errors;

selectively receive a second subset of segments in the second transmission of the message, the second subset of segments in the second transmission corresponding to segments in the first transmission received with decoding errors; and power up the portion of the radio frequency receiver previously powered down prior to reception of the second subset of segments in the second transmission of the message.

16. The non-transitory computer readable medium as recited in claim 15, wherein the at least one program is further configured to, when executed, cause the mobile wireless communication device to:

repeatedly detect, power down, power up and selectively receive one or more segments of the message until each segment of the message has been received correctly.

17. The non-transitory computer readable medium as recited in claim 16, wherein the message comprises a system information block message.

18. The non-transitory computer readable medium as recited in claim 17, wherein the at least one program is further configured to, when executed, cause the mobile wireless communication device to:

receive a master information block message broadcast by the wireless communication network that specifies when the system information block message can be received.

19. The computer readable medium as recited in claim 18, wherein the master information block message includes a tag that indicates when values contained in the system information block message change.

* * * * *

UNITED STATES PATENT AND TRADEMARK OFFICE
CERTIFICATE OF CORRECTION

PATENT NO. : 8,630,216 B2
APPLICATION NO. : 12/895398
DATED : January 14, 2014
INVENTOR(S) : Giri Prassad Deivasigamani et al.

Page 1 of 1

It is certified that error appears in the above-identified patent and that said Letters Patent is hereby corrected as shown below:

In the Claims

Col. 12, line 13: Change "information block" to "information block message".

Col. 12, line 14: Change "system information block" to "system information block message".

Col. 13, line 13: Change "information" to "information message".

Signed and Sealed this
Fifteenth Day of April, 2014

Michelle K. Lee
*Deputy Director of the United States Patent and Trademark Office*